United States Patent
Schilles (10) Patent No.: US 8,562,779 B2
(45) Date of Patent: Oct. 22, 2013

(54) METHOD FOR MANUFACTURING A MOULDED ARTICLE

(75) Inventor: Wilfried Schilles, Kandel (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 358 days.

(21) Appl. No.: 12/863,109

(22) PCT Filed: Jan. 30, 2009

(86) PCT No.: PCT/EP2009/000619
§ 371 (c)(1),
(2), (4) Date: Jul. 15, 2010

(87) PCT Pub. No.: WO2009/095256
PCT Pub. Date: Aug. 6, 2009

(65) Prior Publication Data
US 2011/0114255 A1    May 19, 2011

(30) Foreign Application Priority Data
Jan. 30, 2008   (DE) .................... 10 2008 006 715

(51) Int. Cl.
*B29C 43/18*   (2006.01)
*B29C 43/28*   (2006.01)

(52) U.S. Cl.
USPC ........................................ 156/245; 156/486

(58) Field of Classification Search
USPC ................................................... 156/245
See application file for complete search history.

(56) References Cited

U.S. PATENT DOCUMENTS

| 4,132,591 A | * | 1/1979 | Merges, Jr. ............... 162/146 |
| 4,617,081 A |   | 10/1986 | Bleau |
| 4,986,865 A |   | 1/1991 | Fujii |
| 5,324,384 A | * | 6/1994 | Spengler ................... 156/581 |
| 5,505,612 A | * | 4/1996 | Mero et al. ................ 425/526 |

(Continued)

FOREIGN PATENT DOCUMENTS

| DE | 4007829 A1 | 10/1990 |
| DE | 4303459 A1 | 8/1994 |
| DE | 19750285 A1 | 5/1999 |
| DE | 102004045398 B3 | 5/2006 |
| EP | 0603498 A | 6/1994 |

(Continued)

OTHER PUBLICATIONS

International Search Report for corresponding PCT application PCT/EP2009/000619, dated May 29, 2009.

*Primary Examiner* — Philip Tucker
*Assistant Examiner* — Vicki Wu
(74) *Attorney, Agent, or Firm* — Matthew B. Dernier, Esq.; Gibson & Dernier LLP (57) ABSTRACT

Methods and apparatus provide for laminating a plastics molding with spatial surface contours, in particular for interior trims of motor vehicles, using a backing layer and a decorative layer, where an edge region of the decorative layer, which edge region is provided as a bent-around region, extends beyond the nearby corresponding edge of the backing layer with an exposed rear-side region, including: heating a strip-shaped mold part and placing the heated mold part on the bent-around region of the decorative layer and melting part of the bent-around region; turning the bent-around region over the nearby edge of the backing layer and placing the rear-side region of the bent-around region on the second side, which is positioned opposite the first side, of the backing layer, and pressing the bent-around region onto the backing layer with a second mold part, situated opposite the first mold part.

15 Claims, 4 Drawing Sheets

(56) References Cited

U.S. PATENT DOCUMENTS

| | | | |
|---|---|---|---|
| 5,718,791 A | 2/1998 | Spengler | |
| 5,741,386 A | 4/1998 | Tomioka | |
| 6,092,858 A * | 7/2000 | Bolwell | 296/146.7 |
| 2005/0173047 A1 * | 8/2005 | Buhring et al. | 156/220 |

FOREIGN PATENT DOCUMENTS

| | | |
|---|---|---|
| EP | 0637500 A | 2/1995 |
| EP | 0747201 A | 12/1996 |
| EP | 0792734 A2 | 9/1997 |
| JP | 09254174 A * | 9/1997 |

* cited by examiner

METHOD FOR MANUFACTURING A MOULDED ARTICLE

BACKGROUND

The invention relates to a method for manufacturing a moulded article, in particular for interior linings of motor vehicles.

In particular, the invention relates to a method for manufacturing a moulded article, in particular for interior linings of motor vehicles, with the use of a substrate layer in the form of a plastic fibre mat comprising a contact side and a rear that is opposite the aforesaid, and a covering layer or decorative layer in the form of a plastic film comprising a visible side and a rear side that is opposite the aforesaid, which layers are resting one on top of the other as an arrangement in a tool. Furthermore, the invention relates to a method for laminating a multilayer plastic component comprising edge folding, and in particular a moulded article made of plastic with spatial surface contours, in particular for interior linings of motor vehicles, with the use of a substrate layer and a decorative layer, as well as to a device for laminating a multilayer plastic component. In particular, the invention relates to a method for manufacturing a multilayer plastic component in which an ABS substrate or a PP substrate is laminated with a decorative layer.

From DE 40 07 829 A1 a method for manufacturing a lining panel is known, among other things comprising: simultaneous hot pressing, preparing and penetrating a resin-impregnated substrate for manufacturing a formed substrate; applying an exterior part of a cover layer to an area of the formed substrate while arranging a sandwich layer comprising a hot-melt adhesive plate in between; pressing the exterior part of the cover layer against the formed substrate in the state while the formed substrate is still hot in order to create an unfinished lining panel that is covered by a cover layer; wherein edge regions of the part of the cover layer that are to be edge-folded are attached to the circumferential back sections of the felt with the use of an adhesive connection.

DE 43 03 459 A1 discloses a device for laminating the front of a moulded article with a sheet-like material and for edge folding the edges, which edges protrude beyond the moulded article, of the sheet-like material to the rear of the moulded article with the use of die stamps, by means of which the protruding edges of the sheet-like material are edge-folded to the rear of the moulded article where they are affixed.

DE 197 50 285 A1 describes a method for laminating a substrate, as well as a device for implementing the method. In this arrangement a substrate-layer and a covering layer in an edge-zone, which forms the edge folding, are connected together by thermoplastic welding.

From EP 0 603 498 A1 a method and a device for connecting a decorative layer or covering layer with a substrate layer are known, in which by means of an edge section of a decorative layer or covering layer edge folding is carried out. In this arrangement the decorative layer and the substrate layer, which in each case rest against two separate tool components, are heated and bonded together by means of compression moulding. The compression-moulding tool is designed in such a manner that in this state the edge region of the decorative layer is situated on the central tool component on which the aforesaid rests in the initial position. Furthermore, the exterior edge section is cooled by the top of an edge-folding slider that is situated underneath this outermost edge region of the decorative layer. Furthermore, raising the edge region to be edge-folded, of the decorative layer, together with an edge region of the substrate layer takes place in that the edge-folding slider moves up from a position in which it is at first located below the edge region to be edge-folded, and in this process raises the edge regions of the decorative layer and of the substrate layer together with the edge section to be edge-folded of the decorative layer. By means of moving the edge-folding slider in the direction of the centre of the central forming tool, inward-pushing of the outside edge section of the decorative layer and thus edge folding takes place. Subsequently, by means of the rear of the slider, the edge-folded edge section is pressed onto the rear of the substrate component. This method is based on an already cured substrate layer and decorative layer, which layers themselves are dimensionally stable. The process of edge folding depends on shaping by one of the tool parts, because the edge section of the decorative layer is raised by the substrate layer being pressed on. However, if the component to be manufactured is not to comprise a corresponding curvature at the edge region, which allows such a special shape of the respective tool component, then raising and edge folding the edge region of the decorative layer is possible only with major effort and with probable damage occurring to the visible side of the decorative layer. Furthermore, bonding or welding the edge-folded section of the decorative layer to the rear of the substrate layer with this method is not possible or is possible only in a very uncontrolled manner, if at the same time the visible side of the decorative layer is not to be damaged with certainty.

EP 0 792 734 A2 describes a method for manufacturing a moulded article with a surface covered by laying material or decorative material by back-moulding the laying material or decorative material placed in a moulded article cavity with a plastic material, and by edge folding the end of the laying material or decorative material, characterised in that the end of the laying material or decorative material is attached after the edge-folding injection moulding process by being pushed into the still plastically-formable moulded article. In this process, during the back-moulding process, the laying material end or decorative material end is held, outside the cavity of the moulded article, on its opposite surface sides by an inner and an outer slider. Edge folding takes place in a first step by means of the two sliders, and in a second step after removal of the inner slider by onward movement of the outer slider.

SUMMARY OF THE INVENTION

It is the object of the invention to provide a method for edge folding an at least two-layered source material comprising plastic, and a method for laminating a multilayer plastic component with edge folding of said plastic component, by means of which method in each case edge folding of high quality and, in particular, high accuracy is achievable while at the same time providing an efficient process flow.

This object is met by one or more embodiments disclosed and described herein. Further embodiments are also disclosed and described herein.

According to an exemplary embodiment of the invention, a method is provided for laminating a moulded article made of plastic with spatial surface contours, in particular for interior linings of motor vehicles, with the use of a substrate layer and a decorative layer which are situated as an arrangement in a tool, wherein the visible side of the decorative layer rests against a tool component of the tool, and a first side of the substrate layer rests against the rear of the decorative layer, wherein an edge region, provided as an edge-folding region, of the decorative layer with an exposed rear region extends beyond the corresponding edge of the substrate layer, which edge is near a corresponding edge of the substrate layer, involving the steps of:

heating a heating tool and placing the heated heating tool against the exposed rear region of the edge-folding region of the decorative layer and melting part of the decorative layer along the exposed rear region by means of the heating tool, folding the edge-folding region over the nearby edge of the substrate layer and applying the melted rear region of the edge-folding region onto the second side, which is opposite the first side, of the substrate layer, and pressing the edge-folding region against the substrate layer, removing from the tool the arrangement comprising the substrate layer and the decorative layer with the edge-folding region, which has been applied to the second side of the substrate layer, of the decorative layer.

According to a further exemplary embodiment of the invention, a method for manufacturing a moulded article, in particular for interior linings of motor vehicles, is provided with the use of a substrate layer in the form of a plastic fibre mat comprising a contact side and a rear that is opposite the aforesaid, and a covering layer or decorative layer in the form of a plastic film comprising a visible side and a rear that is opposite the aforesaid, which layers are resting one on top of the other as an arrangement in a tool, inserting the covering layer or decorative layer and the substrate layer between two tool components of a tool, wherein the visible side of the covering layer or decorative layer rests against a first tool component, and the rear of the substrate layer rests against the second tool component so that the connecting sides of the covering layer or decorative layer and of the substrate layer rest against each other, wherein an edge piece of the covering layer or decorative layer, which edge piece extends along at least one section of the outside edge of the covering layer or decorative layer, extends beyond the section of the outside edge of the substrate layer, which section extends along said edge piece, thus forming an exposed rear region, heating a heating tool and moving the heated heating tool towards the exposed rear region of the edge piece, provided for edge folding, of the covering layer or decorative layer for a predetermined period of time in such a manner that the edge piece is melted along the exposed rear region, moving the edge-folding slider from a position in which an upper side of the edge-folding slider rests against the visible side of the edge piece of the covering layer or decorative layer, which edge piece extends beyond the outside edge section of the substrate layer, to a position in which an underside of the edge-folding slider, which underside is situated opposite the upper side, presses a section of the covering layer or decorative layer against the outside edge of the substrate layer, wherein the edge piece is swung in the direction of its edge-folding position, moving the edge-folding slider to a position in which one side of the edge-folding slider rests against the visible side of the covering layer or decorative layer, wherein the edge-folding slider is moved into this position in such a manner that the melted-on rear of the edge piece of the covering layer or decorative layer, which edge piece extends beyond the section of the outside edge of the substrate layer, rests against the rear of the substrate layer; and pressing the edge-folding slider to the visible side of the edge-folded edge piece of the edge-folding region against the substrate layer for bonding the covering layer or decorative layer to the substrate layer in the edge-folded region.

This is followed by the removal, from the tool, of the arrangement comprising the substrate layer and the covering layer or decorative layer with the edge-folding region of the covering layer or decorative layer, which edge-folding region has been placed on the second side of the substrate layer.

Warming or heating the exposed rear region of the edge piece of the covering layer or decorative layer provided for edge folding con be provided by means of a heating tool and by means of, in particular, a heating tape.

The method according to the invention is, in particular, possible with the use of a compression-moulding tool or compression-moulding method in which the covering layer or decorative layer and the substrate layer are placed as mat-like layers into the compression-moulding tool and in such a manner into the compression-moulding tool that the exposed rear region of the edge piece of the covering layer or decorative layer, which edge piece extends beyond the outside edge section of the substrate layer, is positioned outside the compression contour surfaces of the tool components, and that prior to movement of the edge-folding slider between two tool components of a tool, the covering layer or decorative layer and the substrate layer are connected to each other by the two tool components of the compression-moulding tool with the application of pressure and temperature.

As an alternative, the method according to the invention is, in particular, possible with the use of a compression-moulding tool or compression-moulding method in which the covering layer or decorative layer and the substrate layer are used as solidified layers that are connected to each other and are placed onto a tool component, wherein, in particular, it is provided for the visible side of the decorative layer to rest against the tool component.

According to an exemplary embodiment, the method according to the invention can be implemented in a compression-moulding tool. Consequently it is not necessary to use a dedicated tool for edge folding. Likewise, no tool-change is necessary if compression moulding and edge folding are to be provided on the same component, and as a result of this no costs are incurred for the edge-folding tool, and the time required for manufacturing the component is also shortened.

In the method according to the invention it can be provided for the covering layer or decorative layer and the substrate layer to be put in place in the tool components as cured layers and as layers that are connected to each other by means of a compression-moulding method.

According to the invention it can be provided for the covering layer or decorative layer and the substrate layer to be designed in such a manner that the width of the exposed rear region, which region extends between the outside edge of the substrate layer and the outside edge of the covering layer or decorative layer, of said covering layer or decorative layer ranges from 5.0 mm to 25.0 mm.

According to the invention, a polypropylene (PP)-bound fibre mat can be used as a source material for the substrate layer, and/or the covering layer or decorative layer can comprise a film layer.

Furthermore, it can be provided for the covering layer or decorative layer to comprise TPO (thermoplastic polyolefin) or PVC (polyvinyl chloride).

The covering layer or decorative layer can comprise a covering film and a foam layer comprising polypropylene (PP), which foam layer forms the rear, wherein the foam layer of the covering layer or decorative layer (12) can, in particular, comprise polypropylene (PP).

The method according to the invention can, in particular, provide for the covering film of the covering layer or decorative layer to comprise a thickness ranging from 0.3 mm to 0.7 mm, and for the foam layer of the covering layer or decorative layer to comprise a thickness ranging from 1.0 mm to 3.0 mm.

The heating tool used can, in particular, be a heating tape, and heating of a heating tool can take place by means of resistance heating.

According to the method according to the invention, during the approach of the heated heating tool to the exposed rear region of the edge piece of the covering layer or decorative layer, which edge piece is provided for edge folding, the upper side of the edge-folding slider rests against the visible side of the edge piece of the covering layer or decorative layer, which edge piece extends beyond the outside edge section of the substrate layer.

According to the invention, the approach of the heated heating tool to the exposed rear region of the edge piece of the covering layer or decorative layer, which edge piece is provided for edge folding, also includes the placement and contacting of the heating tool to or with the exposed rear region.

According to the invention, the covering film of the covering layer or decorative layer can, in particular, comprise a thickness ranging from 0.3 mm to 0.7 mm, and the foam layer of the covering layer or decorative layer can comprise a thickness ranging from 1.0 mm to 3.0 mm. Furthermore, it can be provided for the heating tool to be pressed against the exposed rear region in such a manner that the foam layer comprises a thickness ranging from 0.1 to 0.2 mm.

According to a further exemplary embodiment of the method according to the invention for manufacturing a moulded article, during melting of the edge piece of the covering layer or decorative layer the tool component that faces the rear of the substrate layer can be heated to a temperature of between 100 and 170 degrees Celsius, wherein in this process the distance between the outside of the tool component and the rear of the substrate layer is between 1.0 and 10.0 Mm.

Folding the edge-folding region over the nearby edge of the substrate layer can take place by means of an edge-folding slider or slider. Furthermore, the slider for folding the edge-folding region over the nearby edge of the substrate layer can be moved, when viewed from the interior of the tool, from the outside along the tool contour of the first tool component, which tool contour faces the decorative layer, towards the edge-folding region of the decorative layer.

The tool contour of the first tool can be designed in such a manner, and the slider can comprise a surface in such a manner that the slider for folding over the edge-folding region is moved in such a manner that the edge-folding region folds over the edge of the substrate layer, which edge is near the slider. In this arrangement, folding over of the heated edge-folding region can take place by means of a slider that moves from one side of the tool to the edge of the edge-folding region, which slider is moved in such a manner that after the slider contacts the edge region that is provided as an edge-folding region said edge region is folded over to the rear of the substrate layer by the onward movement of the slider.

In this arrangement in an initial position prior to edge folding the slider can rest against the outside region of the first tool in such a manner that the tip of said slider is directed towards the interior of the first tool component, that the slider is moved along the upper side of the first tool component so that during this movement the edge region is received by the obliquely extending contour and is lifted from the first tool component, and that the slider continues to be moved in such a manner that the edge region is folded over onto the rear of the substrate layer onto which folding over of a protruding edge-folding region of the decorative layer can take place over the edge of the substrate layer. Furthermore, it can be provided for the slider, after folding over the edge region onto the rear of the substrate layer, to continue to be moved in such a manner that the rear of said slider presses the edge region of the decorative layer, which edge region is situated on the rear of the substrate layer, against the substrate layer.

In a further process-related step it can be provided for the underside of the slider to be pressed against the side of the edge region, which side is situated on the visible side of the decorative layer, in order to press the edge region against the rear of the substrate layer.

According to the method according to the invention, prior to folding over the heated edge-folding region the arrangement comprising the substrate layer and the decorative layer is situated between two tool components of a tool, and affixing the arrangement comprising the substrate layer and the decorative layer takes place by pressing together the two tool components.

Furthermore, during melting of the edge-folding region on the exposed surface of the foam layer of the decorative layer by means of the heated tool component, the tool components can be in a state that presses together the arrangement comprising the substrate layer and the decorative layer.

Furthermore, prior to folding over the heated edge-folding region, the edge-folding region that extends beyond the edge of the substrate layer can arise as a result of trimming the decorative layer by means of a cutting device. In this arrangement, trimming the decorative layer can take place by means of the cutting device at the same time as heating the edge-folding region.

Heating the edge-folding region can, in particular, take place by means of resistance heating and/or with the use of heating cartridges. The substrate layer can e.g. comprise polypropylene or ABS. In any case the decorative layer can comprise a foam layer and a film or a textile layer. In particular, the decorative layer can be a compact film.

A further aspect of the invention provides for a device for laminating a moulded article made of plastic with spatial surface contours, in particular for interior linings of motor vehicles, with the use of a substrate layer and a decorative layer, comprising: two tool components for receiving an arrangement of two layers comprising an edge-folding slider or slider, and a movement mechanism by means of which the slider is movable along the tool contour of the first tool by means of actuation of an actuation device. The movement mechanism can, in particular, be designed in such a manner that the slider can carry out a translatory movement superimposed by a rotary movement.

In this arrangement a movement mechanism and an actuating mechanism can be provided, by means of which the speed of the slider during the movement along the tool contour of the first tool can be set.

The slider or edge-folding slider can comprise an underside (and a contour that extends obliquely from said underside), with a tip situated between the aforesaid so that the underside and the obliquely extending contour form a wedge-shaped slider cross section. The tip can, in particular, be wedge-shaped. In sections the tip can comprise a convex upper side when viewed in the intended feed direction of said tip.

Furthermore, the movement mechanism for moving the slider can be designed in such a manner that in an initial position prior to edge folding the slider rests against the outside region of the first tool in such a manner that its tip is directed towards the interior of the first tool component; that during actuation of the movement mechanism the slider is moved along the upper side of the first tool component so that during this movement the edge region is received by the obliquely extending contour and is lifted from the first tool component; and that during actuation of the movement mechanism the slider continues to be moved in such a manner that the edge region is folded over onto the rear of the substrate layer onto which folding a protruding edge-folding region of the decorative layer over the edge of the substrate layer can take place.

In these embodiments the slider, on its rear that is situated opposite its front that comprises the tip, can comprise a contour region which with a deviation, extending perpendicularly to the aforesaid, of at most 15% relative to the length of the tool underside, comprises the same cross-sectional shape as does the contour surface of the first tool component at a position at which during positioning, of the first tool component, of the decorative layer and the substrate layer, which positioning is destined for edge folding, the edge region is situated.

Starting from the tip, behind the wedge-shaped contour the slider can comprise a concave contour, so as to, during movement of the slider towards the edge region, receive the aforesaid and make it assume a curvature in which folding over of the edge region on the edge of the substrate layer is supported.

The movement mechanism for moving the slider can be designed in such a manner that, after the edge region is folded over to the rear of the substrate layer, the movement mechanism as a result of its actuation continues to move the slider in such a manner that the rear of said slider presses the edge region, situated on the rear of the substrate layer, of the decorative layer onto the substrate layer.

By means of the method according to the invention of edge folding, or by means of the method for laminating a plastic component or plastic semifinished product with a decorative layer with edge forming, generally speaking an interior fitment part and in particular an interior lining part of a vehicle is manufactured, for example a dashboard, or an interior lining part for a door. The latter can, for example, be the map pocket of a side door of a vehicle, a component such as the lid of a centre console, or a sub-item of such interior lining parts. The interior fitment part according to the invention can also be a seatback, a receptacle or a storage compartment in the side door, a ceiling lining panel or a roof liner, a door trim panel, a lid for a storage compartment, a lining panel for the rear storage compartment or part of these interior lining parts.

BRIEF DESCRIPTION OF THE DRAWINGS

Below, exemplary embodiments of the invention are described with reference to the enclosed FIGS. 1 and 2, which show the following:

FIG. 1 illustrates a diagrammatic cross-sectional view of a first method-related step of an exemplary embodiment of the method according to the invention and of the manufacturing device according to the invention in an initial state in which a covering layer or decorative layer and a substrate layer are inserted between two tool components of a tool, and a heated heating tool in the form of a heating tape is positioned a short distance above an edge piece of the covering layer or decorative layer, which edge piece extends along at least one section of the outside edge of the covering layer or decorative layer, for heating said covering layer or decorative layer, wherein the covering layer or decorative layer rests against an upper side of the edge-folding slider, wherein in the initial state the edge piece rests against the tool component;

DETAILED DESCRIPTION OF THE INVENTION

The method according to the invention for edge folding and/or for laminating a multilayer plastic component uses, in particular, a substrate layer 11 in the form of a plastic fibre mat comprising a contact side and a rear, situated opposite the aforesaid, and a covering layer or decorative layer 12, hereinafter at times in an abbreviated manner termed "decorative layer", in the form of a plastic film comprising a visible side and a rear, situated opposite the aforesaid, which are situated one on top of the other as an arrangement in a tool W.

Figure 1:
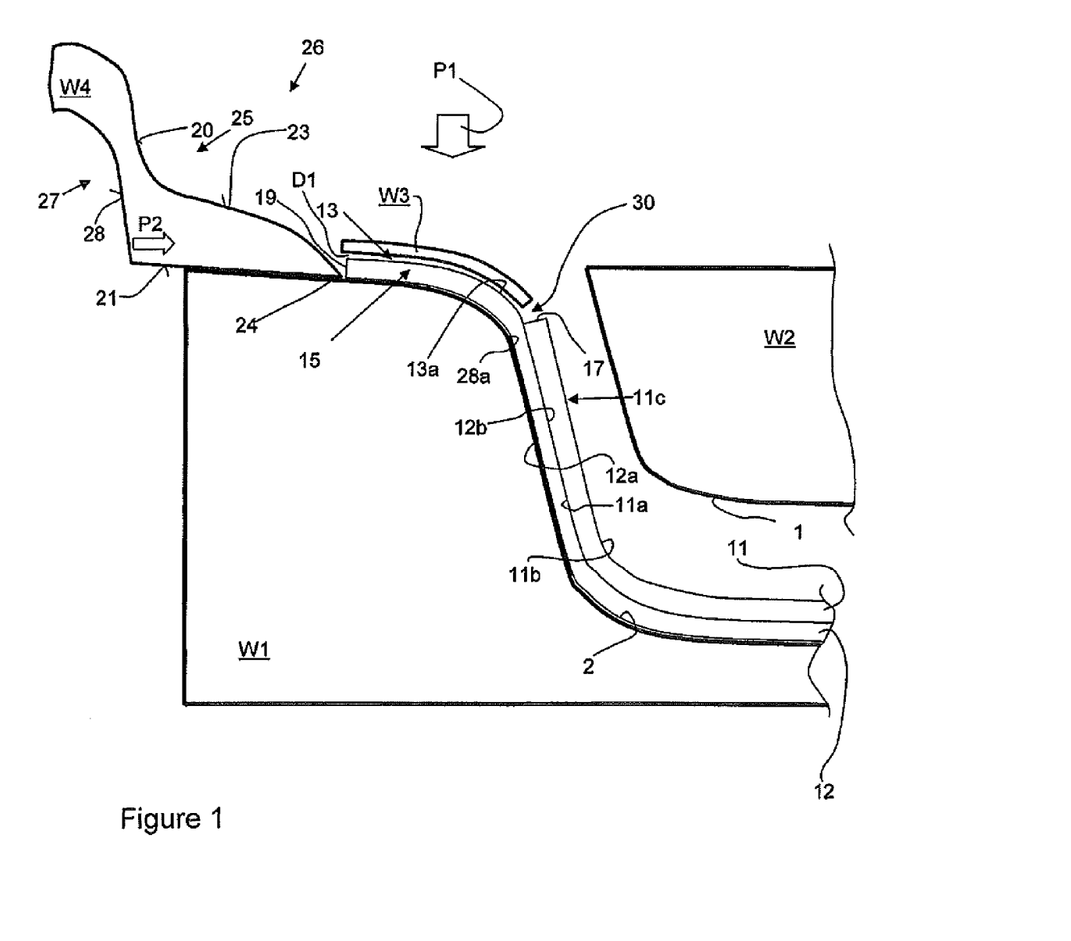
Figure 2:
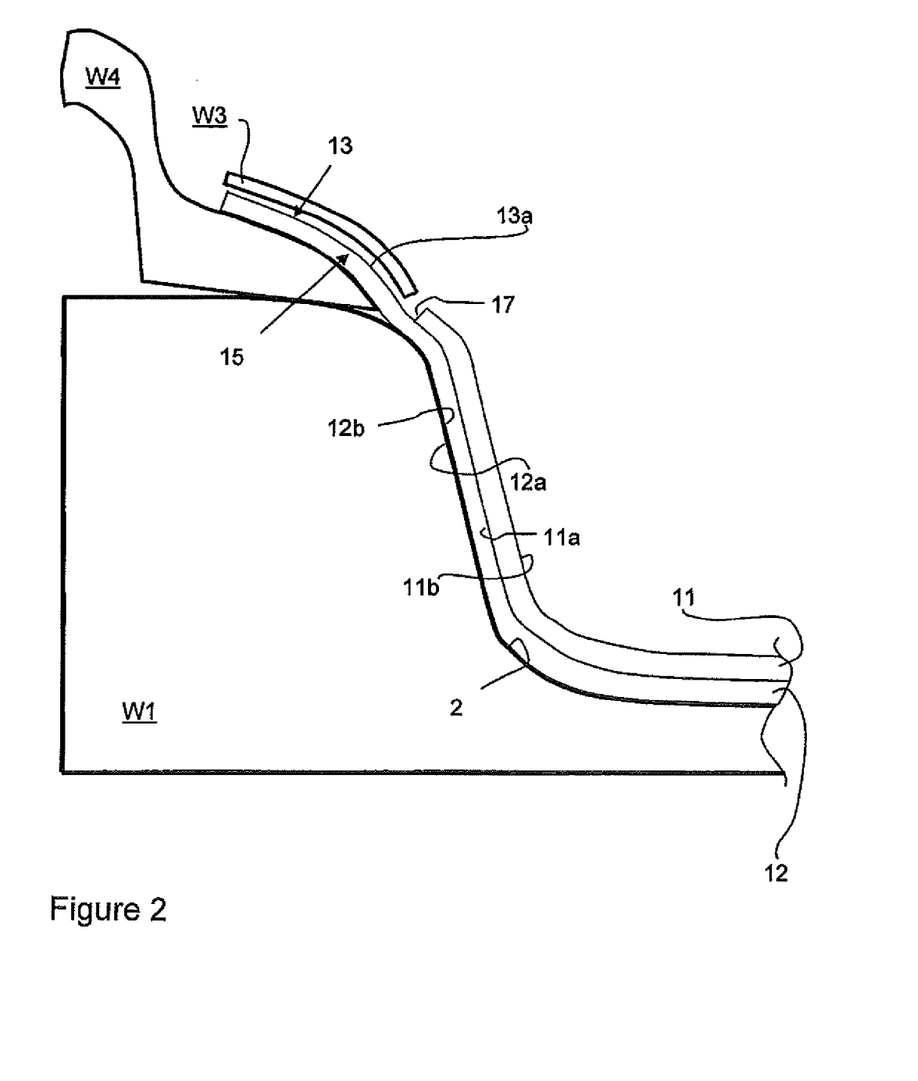
FIG. 2 illustrates a diagrammatic cross-sectional view of an exemplary embodiment of the method or of the manufacturing device according to the invention, which exemplary embodiment provides an alternative to that shown in FIG. 1, in which in an initial state the edge piece rests against the upper side of the edge-folding slider.
Figure 3:
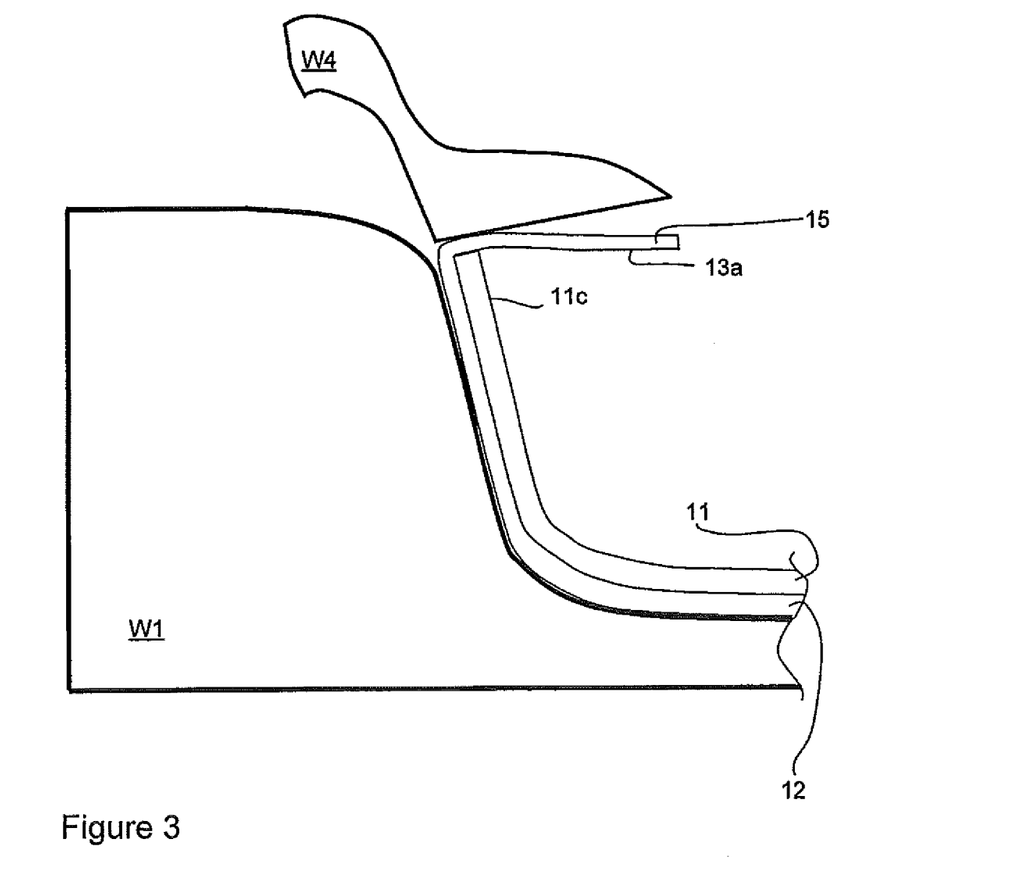
FIG. 3 illustrates a diagrammatic cross-sectional view of the exemplary embodiment of the method or of the manufacturing device according to FIG. 1 or 2 in a state in which an underside of the edge-folding slider, which underside is situated opposite the upper side, presses a section of the covering layer or decorative layer onto the outside edge of the substrate layer, wherein the edge piece of the covering layer or decorative layer is swung in the direction of its edge-folding position.
Figure 4:
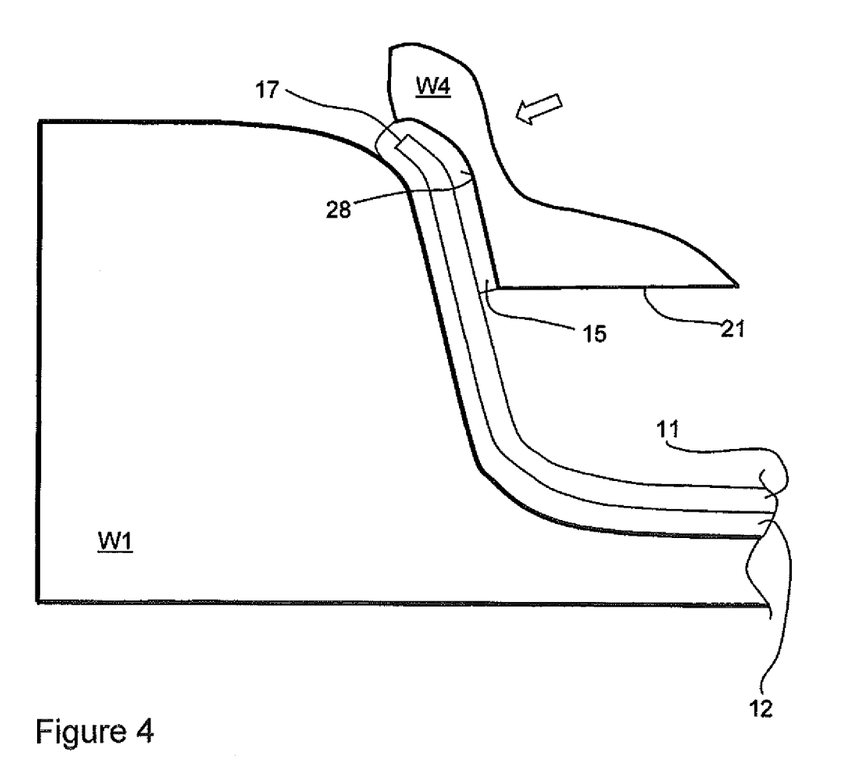
FIG. 4 illustrates a diagrammatic cross-sectional view of the exemplary embodiment of the method or of the manufacturing device according to FIG. 1 or 2 in the following state, shown in FIG. 3, in which pressing the edge-folding slider to the visible side of the edge-folded edge piece of the edge-folding region takes place against the substrate layer in order to bond the covering layer or decorative layer to the substrate layer in the edge-folded region.

The tool W can, in particular, be designed as a compression-moulding tool comprising two tool components W1, W2, each comprising forming contours 1 or 2. In this arrangement in an initial state the covering layer or decorative layer 12 and at least one substrate layer 11 can have been connected to each other by compression moulding. In this method, first forming the covering layer or decorative layer 12 and of at least one substrate layer 11 takes place, as does connecting the two layers 11, 12 to each other by moving together a first tool component, which faces the substrate layer, which tool component comprises a three-dimensional forming contour, and a second tool component, which faces the second decorative layer, which second tool component comprises a three-dimensional forming contour, so that the single-layer or multilayer substrate layer is destined to rest against the contour-shaping region of the first tool component, and the single-layer or multilayer decorative layer is destined to rest against the contour-shaping region of the second tool component. The tool components can be the same tool components W1, W2 as shown in FIG. 1 and that are used for the method-related step of edge folding. As an alternative, the connection of the decorative layer 12 to the substrate layer 11 can also take place in another tool. Generally speaking, both layers can be of a multilayer design, wherein it is also possible for several layers of the decorative layer or of the substrate layer to be formed and connected to each other with the use of the method according to the invention. Generally speaking, the decorative layer and the substrate layer are layers which on their facing surfaces can be connected to each other under pressure, e.g. at least in some regions they can be melted together or made to engage in an interlocking manner.

In this arrangement a woven textile material, foamed synthetic leather, a plastic film, or leather can be used as a decorative layer. If a woven textile material is used as a decorative layer, a layer comprising woven textile materials or films or a combination of those two or a combination of the above-mentioned alternatives can be used as the source material. In one exemplary embodiment the decorative layer comprises, in particular, also foamed components, among other things in order to optimise the haptic qualities of the end product on the corresponding side of the component. Furthermore, the decorative layer can be a compound structure comprising textile materials, a foam and a fleece material. A PP foam or PE foam or a PU-based foam can be used as a foam. In a further exemplary embodiment the decorative layer 12 can comprise a foam layer and a cover layer, situated on top of the aforesaid, with the outwardly exposed visible side of the decorative layer. As an alternative, a single-layer material, and in particular a so-called compact film, can also be used as a decorative layer.

In particular a plastic, and especially a polypropylene (PP)-bound, fibre mat or an ABS plastic material (Acrylonitrile-Butadiene-Styrene copolymerisate plastic) in the form of a mat is provided as a substrate layer. The aforesaid can, in particular, be plasticiseable with the application of heat. The substrate layer preferably comprises a fibre material, preferably comprising natural fibres or glass fibres or plastic fibres, and, in particular, polypropylene (PP) fibres. The natural fibres can comprise flax or kenaf, sisal, linen or cotton. In this case, in a preparatory step or in a step that precedes the method, these fibres are formed into a mat. Subsequently, with the application of pressure and temperature, and with melting the plastic fraction, an interconnected plastic mat material is formed for use as a substrate layer according to the invention.

In the manufacture of the component comprising a substrate layer and a decorative layer the facing sides of the decorative layer and of the substrate layer need to be connectable to each other by means of the pressure exerted by the tool, if need be with the application of heat. To this effect at least the surface of the decorative layer, which surface faces the substrate layer, can comprise a woven material or which comprises, for example, a fleece, a felt, a flat woven material or a round-knit material. A connection of the decorative layer with the substrate layer can also take place by melting the facing surfaces with the application of pressure by the tool, and if applicable with the use of heat. Melting is achieved in that the decorative layer at its side facing the substrate layer comprises foamed components that belong to the same family of materials as does the substrate layer provided for melting. In order to heat the substrate layer and the decorative layer the tool components comprise a contour-conforming heater.

Accordingly, the decorative layer comprises a front or visible side or first side 12a and a second side or rear 12b on which foam components are arranged. Furthermore, the substrate layer of the decorative layer, which substrate layer faces the substrate layer 11, can comprise the characteristic of mechanically connecting to the substrate layer when subjected to pressure, for example by means of mechanical engagement, in an interlocking manner, of threads or hair applied to said side of the decorative layer, with the surface, which if applicable has been partly melted, of the substrate layer.

Apart from the covering layer or decorative layer 12 and the substrate layer 11, in the method according to the invention in addition at least one intermediate layer and/or one reinforcement layer, e.g. a layer comprising woven glass fibre, can be used, which layer can be situated between the material layer and the decorative layer or underneath the substrate layer, in other words on the side of the substrate layer, which side is opposite the side that faces the decorative layer.

The tool components W1, W2 are moved towards each other by means of a pressure transducer in order to cause deformation of the substrate layer or of the decorative layer as well as the connection of the two layers to each other by moving the first and the second tool component together. The first tool component W1 can be installed on a first tool holder or a mounting plate, and the second tool component W2 can be installed on a second tool holder or a mounting plate.

The compression-moulding tool according to the invention can, furthermore, comprise a tension frame device (not shown) comprising at least two tension frames or tension-frame elements that are movable relative to each other and relative to the tool components, which tension frames or tension-frame elements are preferably slidable relative to the tool components in order to keep the substrate layer and/or the decorative layer in a predetermined manner outside the contour region of the tool during the forming process. The mobility of the tension frames relates at least to the mobility in the direction of the opening movement and closing movement of the tool components. In each case the tension-frame elements are arranged outside the contour-shaping regions of the tool components. The aforesaid can be formed in a single part and can be designed as objects that encompass the tool components. The tension-frame elements can also be designed in several parts along the circumference or along a region of the circumference of the tool components. Moreover, a tension-frame element can comprise two parts that are arranged at locations outside the tool components 11, 12. These locations can, in particular, be diametrically opposed to each other. Furthermore, several, e.g. three or four, parts of a tension-frame element can be arranged outside the circumference of the respective tool component or tool components, depending on the particular application either regularly or irregularly distributed on said circumference.

The tension-frame elements can be variously formed. The design and arrangement of the tension-frame elements depend on the type, material and design of the component to be manufactured, or on the type, material and design of the materials. In each case the tension-frame elements comprise one contact region or two contact regions which is/are provided during manufacture of the component so that a protruding region of the substrate layer and/or of the decorative layer can be placed against said contact region/s.

The method according to the invention for laminating moulded articles with spatial surface contours or for laminating a multilayer plastic component with subsequent edge folding at first takes place in that the substrate layer is placed, by means of a tensioning frame, against the contour-shaping surface of the first of the tool components. As an alternative, the already formed material comprising the interconnected covering layer or decorative layer 12 and substrate layer 11 is placed in a tool W. In both methods the covering layer or decorative layer 12 and the substrate layer are situated in such a manner, and if applicable are created by corresponding trimming of the covering layer or decorative layer 12 and/or of the substrate layer 11, that an edge piece 15 or edge section 15 that extends along at least one section of the outside edge 19 of the covering layer or decorative layer 12 extends beyond the section of the outside edge 17 of the substrate layer 11, which section extends along the aforesaid, while forming an exposed rear region 13. The decorative layer thus comprises one or several edge-folding regions or edge pieces 15, i.e. regions that protrude relative to the substrate layer when the decorative layer rests against the substrate layer in a manner predetermined for the compression process or after a compression moulding process.

In the method-related step for connecting the substrate layer 11 to the decorative layer 12, trimming of the substrate layer and/or of the decorative layer can be provided. This can take place with the use of one or several tensioning frames.

In the method according to the invention subsequently edge folding is carried out with the edge region 15 of the decorative layer 12, which edge region 15 protrudes relative to the substrate layer. This method-related step can be carried out with a tool W that differs from the compression-moulding tool used in the preceding method-related step. Trimming the substrate layer and/or the decorative layer can take place, as an alternative or in addition, in the tool that has been specially provided for edge folding.

For edge folding, the visible side 12a of the decorative layer 12 rests against a tool component W1 of the tool W. In turn, a first side 11a of the substrate layer 11 rests against the rear 13 of the decorative layer 12 so that the decorative layer 12 and the substrate layer 11 are situated in the tool W as an arrangement. An exposed rear region 13a of an edge region 15, provided as an edge-folding region, of the decorative layer 12 extends beyond the corresponding nearby edge 17 of the substrate layer 11.

In this state, trimming the substrate layer and/or the decorative layer can be provided as an alternative or in addition to trimming in the compression-moulding method. Trimming can take place by means of a cutting device. The knife of said cutting device can, in particular, be heated. During cutting, the tool components W1 and W2 can be in their moved-together state in which they hold the arrangement comprising the decorative layer and the substrate layer.

In the creation of the edge fold, in the state in which the decorative layer 12 and the substrate layer 11 are in place in the tool W, heating of a heating tool and, in particular, of a strip-shaped tool component or heating tape W3 takes place, as does moving towards or additional placing of the heated tool component W3 against the exposed rear region 13a of the edge-folding region 13 of the decorative layer 12 (arrow P1). In this arrangement the longitudinal direction of the strip-shaped tool component W3 extends along the exposed edge of the edge region of the decorative layer, however, it extends above the exposed rear region 13a. The strip-shaped tool component W3 is heated, and stores an adequate quantity of heat, in such a manner that during moving or placing, according to the invention, the strip-shaped tool component W3 towards or against the rear region 13a melting of part of the decorative layer 12 in and along the exposed rear region 13a takes place.

The heating tape W3 comprises a thickness of preferably 1 to 10 mm. As a result of designing the heater as a heating tape it is possible to cause the heating tape to assume a shape which is to be described three-dimensionally and to cause it to adapt to the design of the rear region 13a.

The heating tape can, in particular, be a resistance heating tape, e.g. comprising VA steel or aluminium, that can be heated with the application of electrical current. Transferring the heat contained in the heating tool or heating tape W3 can take place in a state in which the surface of the heating tool or heating tape W3, which surface faces the rear region 13a, is spaced apart from the rear region 13a. In this case the distance D1 is preferably between 1 mm and 20 mm. In a further exemplary embodiment the heating tool or heating tape W3 can rest against the edge piece 15 when transferring heat to it.

With the use of materials according to the invention, the heating tool comprising a corresponding heating surface or heating tape W3 has a temperature of between 180 degrees Celsius and 300 degrees Celsius, and preferably between 220 degrees Celsius and 250 degrees Celsius. In this manner it is possible for the covering layer or decorative layer 12 provided according to the invention by means of close proximity of the heating tool or heating tape W3 to the covering layer or decorative layer 12 or by means of contact between the respective underside or heating surface of the heating tool or heating tape W3 and the covering layer or decorative layer 12 in each case to be heated during a suitable predetermined period of time in a controlled manner so that only a thickness range along the rear region 13a can be melted, while the quality of the visible side of the covering layer or decorative layer 12 is preserved and is not negatively affected. To this effect the thickness range that extends along the visible side of the covering layer or decorative layer 12 needs to remain below a maximum temperature of 120 degrees Celsius, which is possible in a particular manner by means of the solution according to the invention. In this process, according to the invention, the thickness range along the rear region 13a is heated to a temperature of between 170 and 210 degrees Celsius and preferably of between 180 and 190 degrees Celsius.

In particular in the case in which the rear of the covering layer or decorative layer 12 comprises a foam layer, e.g. for reasons relating to the sense of touch or to the visual senses, it can be provided for the heating tool or heating tape W3 to additionally be pressed against the rear region 13a in such a manner that in the rear region 13a the thickness of the cross section of the edge piece of the covering layer or decorative layer 12 is reduced by at least 10%. In this manner it is possible to prevent the forming of a bulge in the covering layer or decorative layer 12 on the edge side 17, and very accurate edge folding in this region can be achieved, with an accuracy of 0.1 mm and furthermore with cross-sectional radii (see figures) of 0.8 to 1 mm. Consequently, very accurate incorporation, in a body part, of the component to be manufactured can be achieved with high accuracy. Pushing into the foam layer of the covering layer or decorative layer 12 can, in particular, take place in such a manner that with an initial thickness of between 1.0 and 3.0 mm said covering layer or decorative layer 12 is pressed together to a thickness of between 0.1 and 0.3 mm.

When heating the edge piece 15 by means of the heating tool or heating tape W3, in addition heating of the edge piece that extends along the edge 17 of the substrate layer, and of a region 30 of the rear of the covering layer or decorative layer 12, which region 30 is situated in front of the edge 17, can take place by means of a second tool component W2. As a result of heating of the region 30, edge folding is supported, in particular at locations at which small radii result. This is advantageous also in those cases in which the heating tool or heating tape W3 cannot heat the edge 17 of the covering layer or decorative layer 12 closely enough to the temperatures mentioned. The second tool component W2 can be a tool component of a compression-moulding device or a heater. In this arrangement the second tool component W2 is heated on a corresponding side, with its heating side being located near the regions 11c and 30, or contacting the region 11c. In these exemplary embodiments the temperature of the heating side is between 100 and 160 degrees Celsius and preferably between 120 and 140 degrees Celsius.

After heating the edge-folding region and melting at least the cross-sectional region of the decorative layer 12, which cross-sectional region rests against the rear 13, folding of the edge-folding region 13 over the nearby edge 17 of the substrate layer 11 takes place, as does application of the rear region 13a of the edge-folding region 13 onto the second side 11b of the substrate layer 11, which second side 11b is situated opposite the first side 11a. Subsequently, the edge-folding region 13 can be pushed or pressed onto the substrate layer 11. This can, in particular, take place with the use of the second tool component W2, which is situated opposite the first tool component W1.

Prior to folding over the edge-folding region, if applicable the heating tool or the strip-shaped tool component W3 must be moved into a position in which said tool component W3 does not hinder the process of folding over.

As an alternative or in addition, heating of the edge-folding region can also take place by heat radiation.

Then follows the removal, from the tool W, of the arrangement comprising the substrate layer 11 and the decorative layer 12 with the edge-folding region of the decorative layer 12, which edge-folding region has been applied to the second side 11b of the substrate layer 11.

If pressing on, or pressing together, the edge-folding region to or with the rear 18 of the substrate layer takes place by means of the second tool component W2, prior to the removal of the arrangement comprising the substrate layer 11 and the decorative layer 12, the tool components W1, W2 must be moved apart.

Folding the edge-folding region 13 over the nearby edge 17 of the substrate layer 11 can take place by means of a slider W4. In this arrangement the slider W4 for folding the edge-folding region 13 over the nearby edge 17 of the substrate layer 12 is moved, when viewed from the interior of the tool W, from the outside (arrow P2) along the tool contour 1 of the first tool component W1, which tool contour 1 faces the decorative layer 12, towards the edge-folding region 15 of the decorative layer 11.

The slider can, in particular, be guided by means of a movement mechanism. Furthermore, an actuating device can be provided by means of which the movement mechanism can be actuated, i.e. started up, and the slider can be moved from an initial position to the operating position and back again.

In this arrangement the tool contour 1 of the first tool W1 and the slider W4 are designed in such a manner that when the slider W4 is moved for edge-folding the edge-folding region 13 a curvature of said edge-folding region 13 in the direction of the substrate layer 12 can be caused, and that the edge-folding region 15 as a result of its gravity is folded over the nearby edge 17 of the substrate layer 11. To this effect the working surface of the slider W4 can, in particular, comprise a concave-curved surface 20 of a suitable design, in which folding of the edge-folding region is efficiently supported, and as far as possible no further tool, let alone manual support of this step, is required.

The invention can provide for, prior to folding-over the heated edge-folding region 13, the arrangement comprising the substrate layer 11 and the decorative layer 12 to be located between the two tool components 1, 2 of a tool W, and for affixation of the arrangement comprising the substrate layer 11 and the decorative layer 12 to take place by pressing together the two tool components W1, W2. Likewise it can be provided, during melting of the edge-folding region 13 of the exposed surface of the foam layer 17 of the decorative layer 12 with the heated tool component 10, for the tool components 1, 2 to be in a state that presses the arrangement comprising the substrate layer 11 and the decorative layer 12 together.

According to the invention, furthermore, a device for laminating a moulded article made of plastic with spatial surface contours, in particular for interior linings of motor vehicles, with the use of a substrate layer 11 and a decorative layer 12 is provided. The device comprises: two tool components W1, W2 for receiving an arrangement comprising two layers with a slider W4, and a movement mechanism by means of which, with the actuation of an actuation device, the slider W4 is movable along the tool contour 1 of the first tool. The movement mechanism and the actuating mechanism are designed in such a manner that with them the speed of the slider during movement along the tool contour 1 of the first tool W1 can be set or implemented.

By heating the edge-folding regions and by partially melting said edge-folding regions the connection between the substrate layer 11 and the rear 13 of the edge-folding region 15 can take place without the use of adhesive. However, it can, in addition, be provided for an adhesive material to be applied to the corresponding region of the rear 18 of the substrate layer.

By means of partially melting the edge-folding region, furthermore, this region, in particular in the region of curvature at the edge 17 of the substrate layer, is formable and/or plasticised in such a manner that the decorative layer 12 on the edge 17 does not bulge but rests closely against the edge 17 of the substrate layer 11, and that also a connection between the decorative layer 12 and the edge 17 of the substrate layer 11 takes place.

The device for laminating a moulded article made of plastic with spatial surface contours thus comprises: two tool components W1, W2 for receiving an arrangement comprising two layers with a slider W4, and a movement mechanism by means of which the slider W4 is movable along the tool contour 1 of the first tool by means of actuation of an actuation device. The slider W4 comprises an underside 21 and can, in particular, comprise an obliquely extending contour 23 that extends from said underside 21, with a tip 24 that is located between the aforesaid so that the underside 21 and the obliquely extending contour 23 form a wedge-shaped slider cross section.

For carrying out the method according to the invention the movement mechanism for moving the slider (W4) can be designed in such a manner that in an initial position prior to edge folding the slider W4 rests against the outside region 40 of the first tool W1 in such a manner that its tip 24 is directed towards the interior of the first tool component W1; that during actuation of the movement mechanism the slider W4 is moved along the upper side of the first tool component W1 so that during this movement the edge region 15 is received by the obliquely extending contour 23 and is lifted from the first tool component W1; and that during actuation of the movement mechanism the slider W4 continues to be moved in such a manner that the edge region 15 is folded over onto the rear 18 of the substrate layer 11 so that folding of a protruding edge-folding region 13 of the decorative layer 12 over the edge 17 of the substrate layer 12 can take place.

On its rear 27 that is situated opposite its front 26 that comprises the tip 24, the slider W4 can comprise a contour region 28 which with a deviation, extending perpendicularly to the aforesaid, of at most 15% relative to the length of the tool underside 21 comprises the same cross-sectional shape as does the contour surface 28a of the first tool component W1 at a position at which during positioning of the decorative layer 12 and the substrate layer 11, which positioning is destined for edge folding, in the first tool component W1 the edge region 15 is situated. The length of the tool underside 21 is, in particular, 75% of the area that rests against the surface of the tool component W1 when the slider is moved along said surface.

The slider W4 can, in particular, be designed in such a way that, starting from the tip 24, behind the wedge-shaped contour 23 a concave contour 25 extends so as to, during movement of the slider W4 towards the edge region 15, receive the aforesaid and make it assume a curvature by which folding over of the edge region 15 on the edge 17 of the substrate layer 11 is supported.

Furthermore, the movement mechanism for moving the slider W4 can be designed in such a manner that, after the edge region 15 is folded over to the rear 18 of the substrate layer 11 by the slider W4, the movement mechanism as a result of its actuation continues to move the slider W4 in such a manner that the rear 28 of said slider W4 presses the edge region 15, situated on the rear 18 of the substrate layer 11, of the decorative layer 12 onto the substrate layer 12

The invention claimed is:

1. A method for manufacturing an edge-folded moulded article for interior linings of motor vehicles, the edge-folded moulded article including: (i) a substrate layer made of plastic, comprising a contact side and an opposite rear side, and (ii) a covering layer or decorative layer in the form of a plastic film comprising a visible side and an opposite rear side formed by a foam layer, which layers are resting one on top of the other as an arrangement in a tool, the method comprising:

inserting the covering layer or decorative layer and the substrate layer, being already connected to one another, between two tool components of the tool, wherein a visible side of the covering layer or decorative layer rests against a first tool component, and the rear side of the substrate layer rests against a second tool component so that connected sides of the covering layer or decorative layer and of the substrate layer rest against each other, wherein an edge piece of the covering layer or decorative layer extends along at least one section of an outside edge of the covering layer or decorative layer and extends beyond a section of an outside edge of the substrate layer, which section extends along said edge piece, thus forming an exposed rear region with an exposed foam layer, where the visible side of the edge piece of the covering layer or decorative layer rests against a portion of the first tool component, heating a heating tool which is adaptable to the contour of the rear region and moving the heated heating tool towards the exposed rear region of the edge piece, provided for edge folding, of the covering layer or decorative layer for a predetermined period of time in such a manner that the edge piece is melted along the exposed rear region, moving an edge-folding slider to a first position in which an upper side of the edge-folding slider rests against the visible side of the edge piece of the covering layer or decorative layer, which edge piece extends beyond the outside edge section of the substrate layer and an underside of the edge-folding slider, which underside is situated opposite the upper side, rests against the portion of the first tool component, such that a portion of the edge-folding slider is interposed between the visible side of the edge piece of the covering layer or decorative layer and the portion of the first tool component, moving the edge-folding slider to a second position in which the underside of the edge-folding slider presses a section of the covering layer or decorative layer against the outside edge of the substrate layer, wherein only the edge piece is swung in a direction of an edge-folding position thereof, moving the edge-folding slider to a position in which one contour region of the edge-folding slider rests against the visible side of the covering layer or decorative layer, wherein the edge-folding slider is moved into this position in such a manner that the melted-on rear of the edge piece of the covering layer or decorative layer, which edge piece extends beyond the section of the outside edge of the substrate layer, rests against the rear side of the substrate layer; and pressing the edge-folding slider with the contour region to the visible side of the edge-folded edge piece of the edge-folding region against the substrate layer for bonding the covering layer or decorative layer to the substrate layer in the edge-folded region.

2. The method for manufacturing a moulded article according to claim 1, wherein:

the tool into which the covering layer or decorative layer and the substrate layer are inserted is a compression-moulding tool, the covering layer or decorative layer and the substrate layer are placed as mat-like layers in such a manner that the exposed rear region of the edge piece of the covering layer or decorative layer, which edge piece extends beyond the outside edge section of the substrate layer, is positioned outside the compression contour surfaces of the tool components, and prior to movement of the edge-folding slider between two tool components of a tool, the covering layer or decorative layer and the substrate layer are connected to each other by the two tool components of the compression-moulding tool with the application of pressure and temperature.

3. The method for manufacturing a moulded article according to claim 1, wherein the covering layer or decorative layer and the substrate layer are put in place in the tool components as cured layers and as layers that are connected to each other by means of a compression-moulding method.

4. The method for manufacturing a moulded article according to claim 1, wherein a width of the exposed rear region, which region extends between the outside edge of the substrate layer and the outside edge of the covering layer or decorative layer, of said covering layer or decorative layer ranges from 5.0 mm to 25.0 mm.

5. The method for manufacturing a moulded article according to claim 1, wherein a polypropylene (PP)-bound fibre mat is used as a source material for the substrate layer.

6. The method for manufacturing a moulded article according to claim 1, wherein the covering layer or decorative layer comprises a film layer.

7. The method for manufacturing a moulded article according to claim 1, wherein the covering layer or decorative layer comprises TPO (thermoplastic polyolefin) or PVC (polyvinyl chloride).

8. The method for manufacturing a moulded article according to claim 1, wherein the covering layer or decorative layer comprises a covering film and a foam layer comprising polypropylene (PP), which foam layer forms the rear.

9. The method for manufacturing a moulded article according to claim 1, wherein the foam layer of the covering layer or decorative layer comprises polypropylene (PP).

10. The method for manufacturing a moulded article according to claim 1, wherein the covering film of the covering layer or decorative layer comprises a thickness ranging from 0.3 mm to 0.7 mm, and the foam layer of the covering layer or decorative layer comprises a thickness ranging from 1.0 mm to 3.0 mm.

11. The method for manufacturing a moulded article according to claim 1, wherein the heating tool is a heating tape, and heating of a heating tool takes place by means of resistance heating.

12. The method for manufacturing a moulded article according to claim 1, wherein during the approach of the heated heating tool to the exposed rear region of the edge piece of the covering layer or decorative layer, which edge piece is provided for edge folding, the upper side of the edge-folding slider rests against the visible side of the edge piece of the covering layer or decorative layer, which edge piece extends beyond the outside edge section of the substrate layer.

13. The method for manufacturing a moulded article according to claim 1, wherein during the approach of the heated heating tool to the exposed rear region of the edge piece of the covering layer or decorative layer, which edge piece is provided for edge folding, the exposed rear region of the covering layer or decorative layer is contacted.

14. The method for manufacturing a moulded article according to claim 1, wherein the covering film of the covering layer or decorative layer comprises a thickness ranging from 0.3 mm to 0.7 mm, the foam layer of the covering layer or decorative layer comprises a thickness ranging from 1.0 mm to 3.0 mm, and the heating tool is pressed against the exposed rear region in such a manner that the foam layer comprises a thickness ranging from 0.1 to 0.2 mm.

15. The method for manufacturing a moulded article according to claim 1, wherein during melting of the edge piece of the covering layer or decorative layer the tool component that faces the rear of the substrate layer is heated to a temperature of between 100 and 170 degrees Celsius, wherein in this process the distance between the outside of the tool component and the rear of the substrate layer is between 1.0 and 10.0 mm.

* * * * *